United States Patent
Stanton et al.

(10) Patent No.: US 11,472,270 B2
(45) Date of Patent: Oct. 18, 2022

(54) IMPACT ABSORBING REINFORCEMENT MEMBER

(71) Applicant: GM GLOBAL TECHNOLOGY OPERATIONS LLC, Detroit, MI (US)

(72) Inventors: Alexander J. Stanton, Lake Orion, MI (US); Carl B. Corman, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 17/167,590

(22) Filed: Feb. 4, 2021

(65) Prior Publication Data
US 2022/0242205 A1    Aug. 4, 2022

(51) Int. Cl.
*B60J 5/04* (2006.01)
*B60J 5/10* (2006.01)

(52) U.S. Cl.
CPC .......... *B60J 5/0461* (2013.01); *B60J 5/0456* (2013.01); *B60J 5/0458* (2013.01); *B60J 5/107* (2013.01)

(58) Field of Classification Search
CPC ...... B60J 5/0443; B60J 5/0448; B60J 5/0444; B60J 5/0456; B60J 5/0461; B60J 5/0458; B60J 5/044; B60J 5/0437
See application file for complete search history.

(56) References Cited

U.S. PATENT DOCUMENTS

| | | | | |
|---|---|---|---|---|
| 5,314,228 A * | 5/1994 | Figge, Sr. | ............... | B60J 5/0447 49/501 |
| 5,906,073 A * | 5/1999 | Hori | ......................... | B60J 5/107 49/394 |
| 6,482,499 B1 * | 11/2002 | Evers | ...................... | F16F 7/121 428/116 |
| 9,487,066 B1 * | 11/2016 | Hansen | ................... | B60J 5/0461 |
| 9,592,721 B1 * | 3/2017 | Kelly | ..................... | B60J 5/0437 |
| 2010/0013266 A1 * | 1/2010 | Nakano | ................... | B60J 5/0443 296/146.6 |
| 2016/0159207 A1 * | 6/2016 | Ogawa | .................. | B60J 5/0445 49/504 |

\* cited by examiner

*Primary Examiner* — Marcus Menezes
(74) *Attorney, Agent, or Firm* — Quinn IP Law

(57) ABSTRACT

An impact absorbing reinforcement member for a liftgate of a vehicle includes a body having a first end and second end opposite the first end, the body including a center reinforcement member, a first outboard reinforcement member extending from the center reinforcement member to the first end and including a first plurality of curved segments, and a second outboard reinforcement member extending from the center reinforcement member to the second end and including a second plurality of curved segments. The first and second pluralities of curved segments laterally extend when the liftgate is subjected to an impact force.

15 Claims, 3 Drawing Sheets

IMPACT ABSORBING REINFORCEMENT MEMBER

INTRODUCTION

The present disclosure relates generally to an impact absorbing reinforcement member for a rear closure of a vehicle.

In a rear impact event, it is desirable that the rear closure of the vehicle (trunk, liftgate, etc.) remain closed. Traditional reinforcement members for rear closures of vehicles are additional components that extend laterally across the liftgate. These traditional reinforcement members are heavy and costly.

SUMMARY

Embodiments according to the present disclosure provide a number of advantages. For example, embodiments according to the present disclosure include an over molded rear closure reinforcement member that absorbs energy by at least partially "straightening" during a rear impact event. The straightening of the reinforcement member in response to the loads applied from the rear impact event minimize tearing of the composite materials of the liftgate, including minimizing separation of the inner panel of the composite liftgate assembly.

In one aspect of the present disclosure, an impact absorbing reinforcement member for a liftgate of a vehicle includes a body having a first end and second end opposite the first end, the body including a center reinforcement member, a first outboard reinforcement member extending from the center reinforcement member to the first end and including a first plurality of curved segments, and a second outboard reinforcement member extending from the center reinforcement member to the second end and including a second plurality of curved segments. The first and second pluralities of curved segments extend when the liftgate is subjected to an impact force.

In some aspects, the first plurality of curved segments includes at least one S-shaped feature extending away from the center reinforcement member.

In some aspects, the second plurality of curved segments includes at least one S-shaped feature extending away from the center reinforcement member.

In some aspects, the first and second pluralities of curved segments are oriented in a normal direction to an impact direction of the impact force.

In some aspects, the body of the impact absorbing reinforcement member extends laterally from a first side of the liftgate to a second side of the liftgate.

In some aspects, the impact absorbing reinforcement member has a first length and extends to a second length that is longer than the first length when the liftgate is subjected to the impact force.

In some aspects, the center reinforcement member is oriented with a latch mechanism of the liftgate of the vehicle.

In some aspects, the impact absorbing reinforcement member is an overmolded component.

In some aspects, the impact absorbing reinforcement member is formed integrally with the liftgate of the vehicle.

In another aspect of the present disclosure, a liftgate assembly for an automotive vehicle includes an inner panel and an impact absorbing reinforcement member coupled with the inner panel. The impact reinforcement member includes a body having a first end and a second end opposite the first end. The body includes a center reinforcement member, a first outboard reinforcement member extending from the center reinforcement member to the first end, and a second outboard reinforcement member extending from the center reinforcement member to the second end. The first outboard reinforcement member includes a first plurality of curved segments and the second outboard reinforcement member includes a second plurality of curved segments and the first and second pluralities of curved segments extend when the liftgate is subjected to an impact force.

In some aspects, the first plurality of curved segments includes at least one S-shaped feature extending away from the center reinforcement member.

In some aspects, the second plurality of curved segments includes at least one S-shaped feature extending away from the center reinforcement member.

In some aspects, the first and second pluralities of curved segments are oriented in a normal direction to an impact direction of the impact force.

In some aspects, the body of the impact absorbing reinforcement member extends laterally from a first side of the liftgate to a second side of the liftgate.

In some aspects, the impact absorbing reinforcement member has a first length and extends to a second length that is longer than the first length when the liftgate is subjected to the impact force.

In some aspects, the center reinforcement member is oriented with a latch and striker assembly of the liftgate of the vehicle.

In another aspect of the present disclosure, an impact absorbing reinforcement member for a liftgate of a vehicle includes a body having a first end and second end opposite the first end, the body including a center reinforcement member, a first outboard reinforcement member extending from the center reinforcement member to the first end and including a first plurality of curved segments, and a second outboard reinforcement member extending from the center reinforcement member to the second end and including a second plurality of curved segments. The first and second pluralities of curved segments laterally extend when the liftgate is subjected to an impact force and the first and second pluralities of curved segments are oriented in a normal direction to an impact direction of the impact force.

In some aspects, the center reinforcement member is oriented with a latch and striker assembly of the liftgate of the vehicle.

In some aspects, the body is an overmolded metallic component.

In some aspects, the body is coupled to an inner panel of the liftgate of the vehicle using a plurality of overmolded pins that establish a plurality of fixed points of the impact absorbing reinforcement member relative to the inner panel while allowing elongation of the first and second pluralities of curved segments when the liftgate is subjected to the impact force.

BRIEF DESCRIPTION OF THE DRAWINGS

The present disclosure will be described in conjunction with the following figures, wherein like numerals denote like elements.

Figure 1:
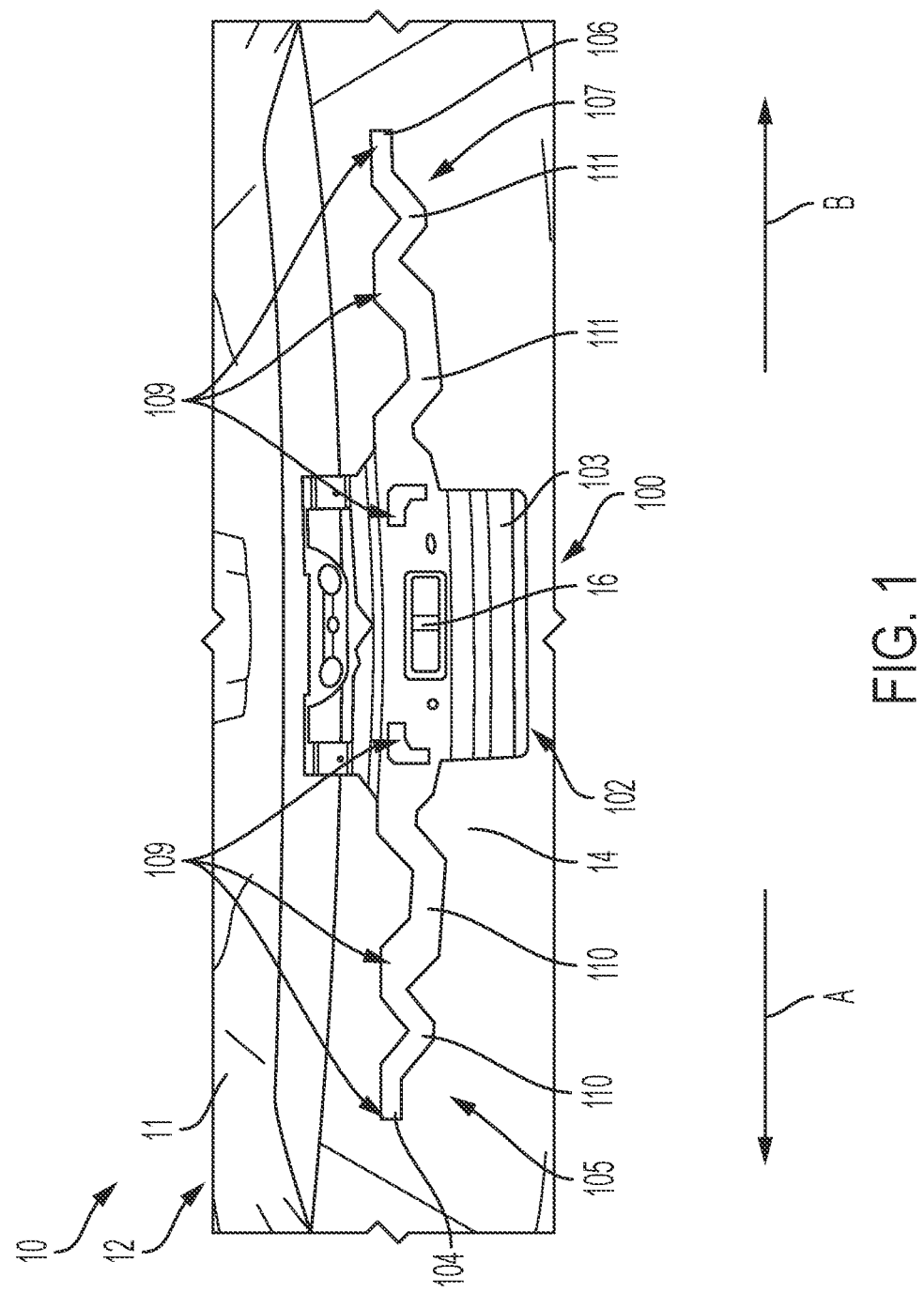
FIG. 1 is a schematic illustration of a liftgate for a vehicle including an impact absorbing reinforcement member, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only,

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

A rear liftgate for a vehicle traditionally includes a component that extends laterally across the entire liftgate. These components are heavy and costly to manufacture and install. An overmolded rear closure reinforcement member such as the impact absorbing reinforcement disclosed herein can prevent separation of a liftgate inner panel from the liftgate assembly during a rear offset impact event.

Figure 2:
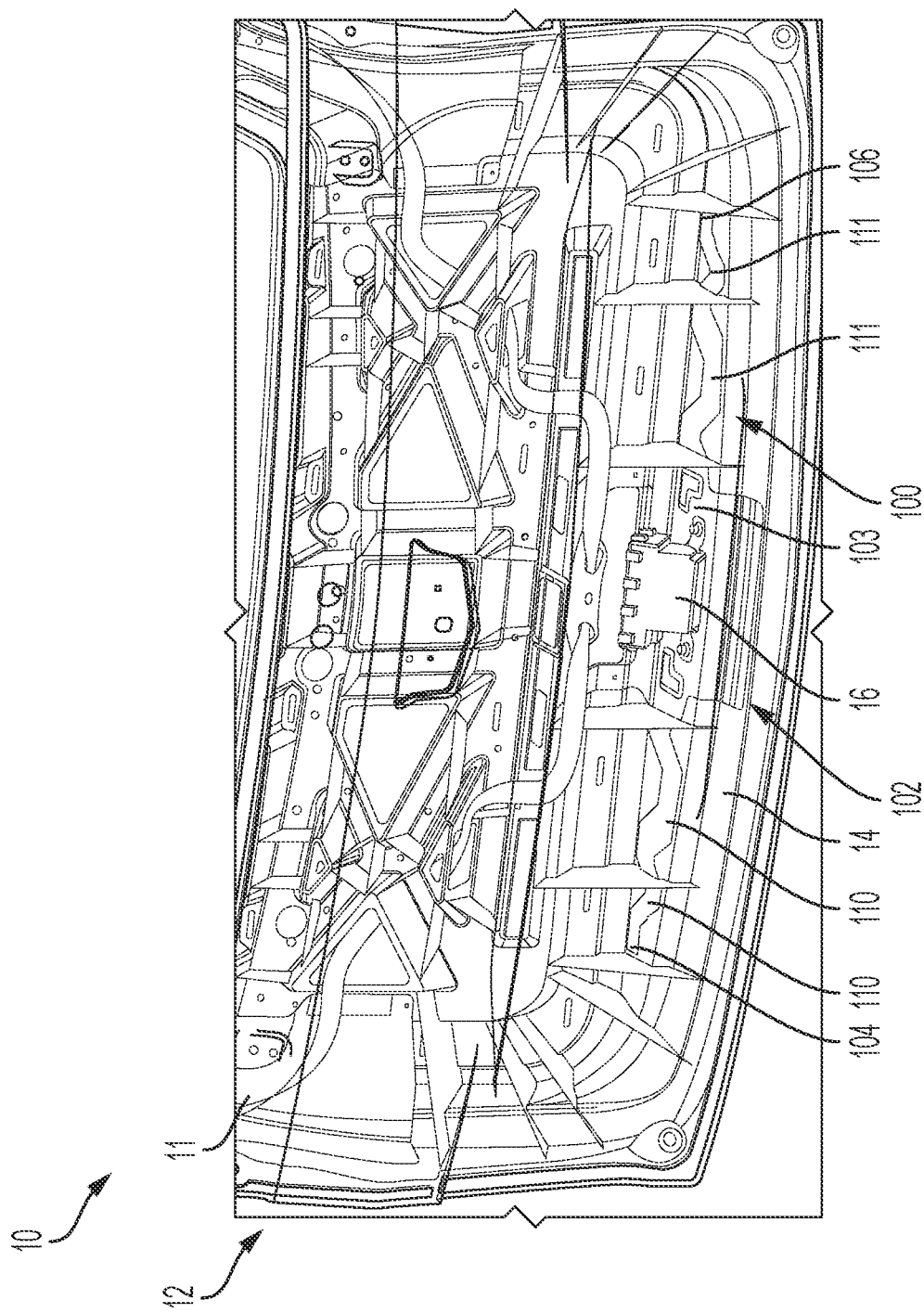
FIG. 2 is a schematic perspective illustration of a liftgate for a vehicle including the impact absorbing reinforcement member of FIG. 1, according to an embodiment.

FIGS. 1 and 2 illustrate a reinforcement member 100, installed as part of a vehicle liftgate assembly 12 of a vehicle 10. The liftgate assembly 12 includes a liftgate 11 having an inner panel 14. The liftgate assembly 12 also includes a latch mechanism 16 coupled with the inner panel 14. The reinforcement member 100 is, in some embodiments, an overmolded and integral feature of the inner panel 14. In various embodiments, the reinforcement member 100 is coupled to the inner panel 14 using any type of mechanical fastener. In various embodiments, the reinforcement member 100 is a metallic component overmolded with the inner panel 14. In various embodiments, the inner panel 15 may be wholly or partly made of a composite material.

The reinforcement member 100 includes a body 102 having a first end 104 and a second end 106 opposite the first end 104. The body 102 includes a center reinforcement member 103. The center reinforcement member 103 is a generally rectangular member that is aligned with the latch mechanism 16 of the liftgate assembly 12. A first outboard reinforcement member 105 extends from the center reinforcement member 103 to the first end 104 of the body 102 and a second outboard reinforcement member 107 extends from the center reinforcement member 103 to the second end 106 of the body 102. The first outboard reinforcement member 105 includes a first plurality of curved segments 110. Similarly, the second outboard reinforcement member 107 includes a second plurality of curved segments 111. Each of the first and second pluralities of curved segments 110, 111 is outboard of the center reinforcement member 103. Additionally, each of the first and second pluralities of curved segments 110, 111 is configured to extend, stretch, or lengthen in a lateral direction when the liftgate of the liftgate assembly 12 is subjected to an impact force, such as a rear offset impact event. As shown in FIG. 1, the first plurality of curved segments 110 extends laterally outboard in the direction indicated by the arrow A and the second plurality of curved segments 111 extends laterally outboard in the direction indicated by the arrow B when the liftgate 11 of the liftgate assembly 12 is subjected to an impact event.

Each of the first and second pluralities of curved segments 110, 111 includes at least one S-shaped feature extending laterally away, or outboard, of the center reinforcement member 103. Additionally, the first and second pluralities of curved segments 110, 111 are oriented in a generally normal direction to a direction of impact of the impact event. That is, the reinforcement member 100 extends laterally across the liftgate 11 of the liftgate assembly 12 from a first side to a second side. The length and width of the S-shaped features of the first and second pluralities of curved segments 110, 111 are determined based on various vehicle configuration considerations including the width of the liftgate 11 of the liftgate assembly 12, etc., for example and without limitation.

In various embodiments, as shown in FIG. 1, the reinforcement member 100 is secured to the inner panel 14 via a plurality of mechanical fasteners 109. In some embodiments, the mechanical fasteners 109 are overmolded pins or rivets. The plurality of mechanical fasteners 109 establish a plurality of fixed points of the reinforcement member 100 relative to the inner panel 14 while still allowing for deformation of the inner panel 14 and associated stretching or elongation of the reinforcement member 100 in response to a rear impact. In various embodiments, the reinforcement member 100 is bonded or overmolded or otherwise coupled to the inner panel 14 in a way that allows the reinforcement member 100 to absorb the energy of an impact event.

Figure 3:
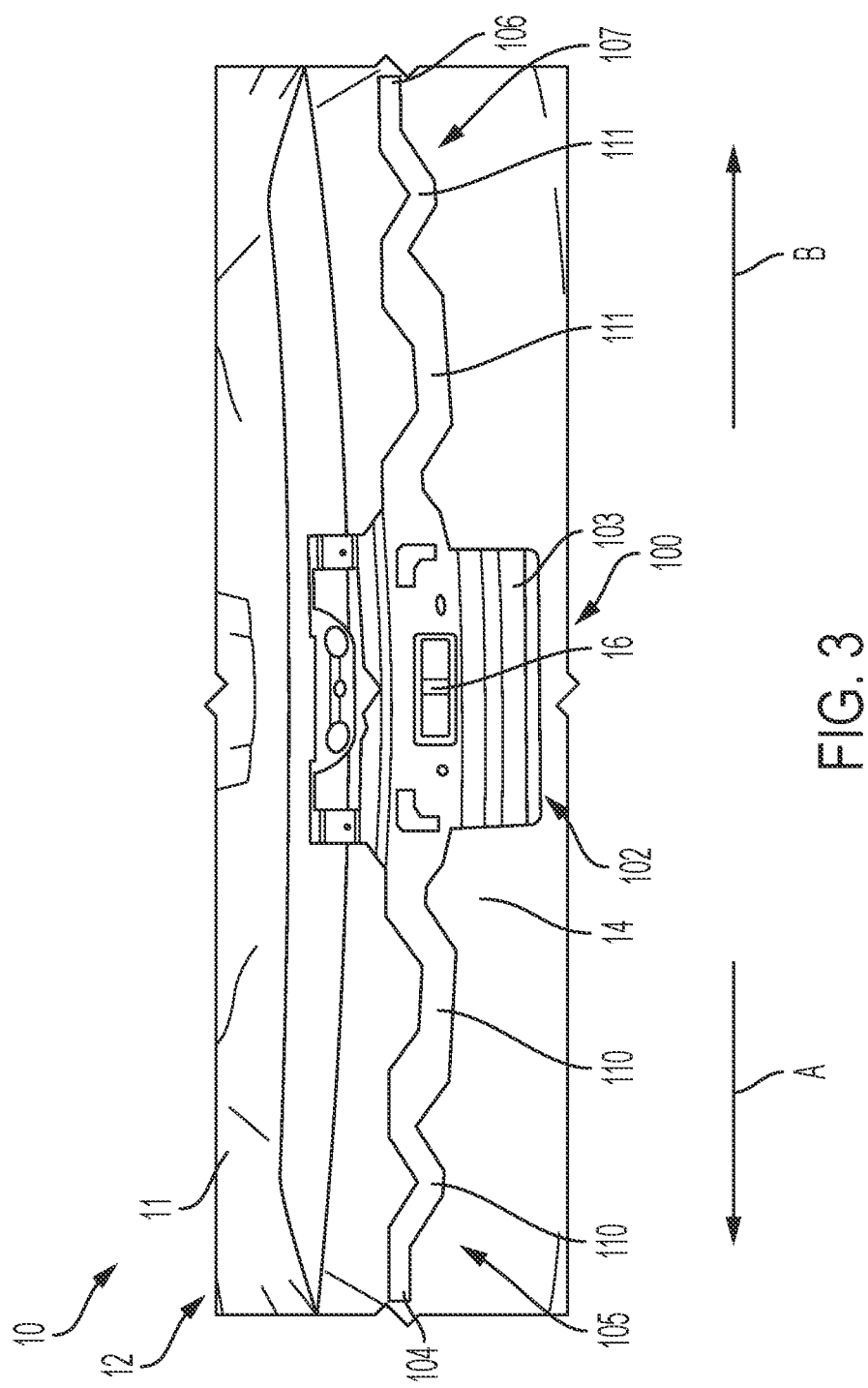
FIG. 3 is a schematic illustration of the impact absorbing reinforcement member of FIG. 1 in an elongated configuration.

As shown in FIG. 1, the reinforcement member 100 has a first length corresponding to an unstretched length. When the liftgate 11 of the liftgate assembly 12 is subjected to an impact force, the reinforcement member 100 extends to a second length that is longer than the first length, as shown in FIG. 3. In one example, the reinforcement member 100 lengthens between approximately 1 mm and 10 mm. In various embodiments, the various S-shaped portions of the first and second pluralities of curved segments 110, 111 elongate different amounts, such as between approximately 0.5 millimeters (mm) and 5. millimeters (mm), for example and without limitation.

With reference to FIG. 2, the center reinforcement member 103 of the reinforcement member 100 is aligned with the latch mechanism 16 of the liftgate assembly 12 of the vehicle 10. Upon an impact event, such as a rear offset impact, the reinforcement member 100 absorbs the energy of the impact and allows the composite material of the inner panel 14 to deform, preventing separation of the latch mechanism 16 from a striker mechanism of the liftgate assembly 12. The malleable metallic material features of the reinforcement member 100 allow the latch mechanism 16 to travel with the striker mechanism of the liftgate 11 of the liftgate assembly 12 rather than separate from the striker mechanism.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example., reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An impact absorbing reinforcement member for a liftgate of a vehicle, comprising:
    a body having a first end and second end opposite the first end, the body including a center reinforcement member, wherein the liftgate of the vehicle includes a latch mechanism and the center reinforcement member defines an aperture aligned with the latch mechanism;
    a first outboard reinforcement member extending from the center reinforcement member to the first end and including a first plurality of curved segments; and
    a second outboard reinforcement member extending from the center reinforcement member to the second end and including a second plurality of curved segments;
    wherein the first and second pluralities of curved segments extend when the liftgate is subjected to an impact force, wherein the first and second pluralities of curved segments are oriented in a normal direction to an impact direction of the impact force, and wherein the reinforcement member is secured to the inner panel via a plurality of fasteners along each segment of the first and second pluralities of curved segments to establish a plurality of fixed points of the reinforcement member relative to the inner panel and allow for deformation of the inner panel and extension of the reinforcement member in response to the impact force.

2. The impact absorbing reinforcement member of claim 1, wherein the first plurality of curved segments includes at least one S-shaped feature extending away from the center reinforcement member.

3. The impact absorbing reinforcement member of claim 1, wherein the second plurality of curved segments includes at least one S-shaped feature extending away from the center reinforcement member.

4. The impact absorbing reinforcement member of claim 1, wherein the body of the impact absorbing reinforcement member extends laterally from a first side of the liftgate to a second side of the liftgate.

5. The impact absorbing reinforcement member of claim 1, wherein the impact absorbing reinforcement member has a first length and extends to a second length that is longer than the first length when the liftgate is subjected to the impact force.

6. The impact absorbing reinforcement member of claim 1, wherein the impact absorbing reinforcement member is an overmolded component.

7. The impact absorbing reinforcement member of claim 1, wherein the impact absorbing reinforcement member is formed integrally with the liftgate of the vehicle.

8. A liftgate assembly for a vehicle, comprising:
   an inner panel;
   a latch and striker mechanism coupled with the inner panel; and
   an impact absorbing reinforcement member coupled with the inner panel, the impact absorbing reinforcement member including a body having a first end and a second end opposite the first end, the body including a center reinforcement member defining an aperture surrounding the latch mechanism, a first outboard reinforcement member extending from the center reinforcement member to the first end, and a second outboard reinforcement member extending from the center reinforcement member to the second end;
   wherein the first outboard reinforcement member includes a first plurality of curved segments and the second outboard reinforcement member includes a second plurality of curved segments and the first and second pluralities of curved segments extend when the liftgate assembly is subjected to an impact force.

9. The liftgate assembly of claim 8, wherein the first plurality of curved segments includes at least one S-shaped feature extending away from the center reinforcement member.

10. The liftgate assembly of claim 8, wherein the second plurality of curved segments includes at least one S-shaped feature extending away from the center reinforcement member.

11. The liftgate assembly of claim 8, wherein the first and second pluralities of curved segments are oriented in a normal direction to an impact direction of the impact force, and wherein the reinforcement member is secured to the inner panel via a plurality of fasteners along each segment of the first and second pluralities of curved segments to establish a plurality of fixed points of the reinforcement member relative to the inner panel and allow for deformation of the inner panel and extension of the reinforcement member in response to the impact force.

12. The liftgate assembly of claim 8, wherein the body of the impact absorbing reinforcement member extends laterally from a first side of the liftgate assembly to a second side of the liftgate assembly.

13. The liftgate assembly of claim 8, wherein the impact absorbing reinforcement member has a first length and extends to a second length that is longer than the first length when the liftgate assembly is subjected to the impact force.

14. An impact absorbing reinforcement member for a liftgate of a vehicle, comprising:
   a body having a first end and second end opposite the first end, the body including a center reinforcement member, wherein the liftgate of the vehicle includes a latch and striker mechanism and the center reinforcement member defines an aperture aligned with the latch and striker mechanism;
   a first outboard reinforcement member extending from the center reinforcement member to the first end and including a first plurality of curved segments; and
   a second outboard reinforcement member extending from the center reinforcement member to the second end and including a second plurality of curved segments;
   wherein the first and second pluralities of curved segments laterally extend when the liftgate is subjected to an impact force and the first and second pluralities of curved segments are oriented in a normal direction to an impact direction of the impact force, and wherein the reinforcement member is secured to the inner panel via a plurality of fasteners along each segment of the first and second pluralities of curved segments to establish a plurality of fixed points of the reinforcement member relative to the inner panel and allow for deformation of the inner panel and extension of the reinforcement member in response to the impact force.

15. The impact absorbing reinforcement member of claim 14, wherein the body is an overmolded metallic component.

* * * * *